Nov. 13, 1945.  M. THORSSON  2,389,108
SCALE
Filed Sept. 23, 1942  2 Sheets-Sheet 2
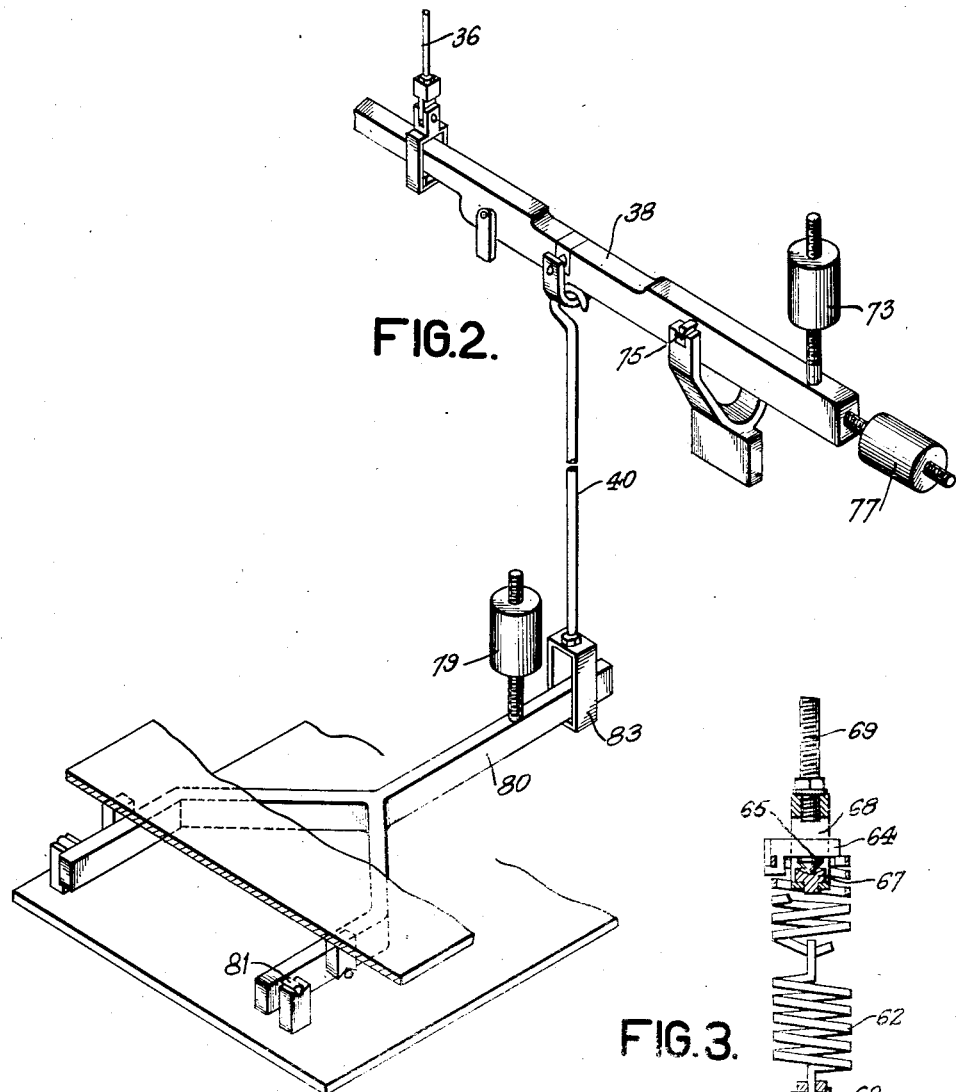
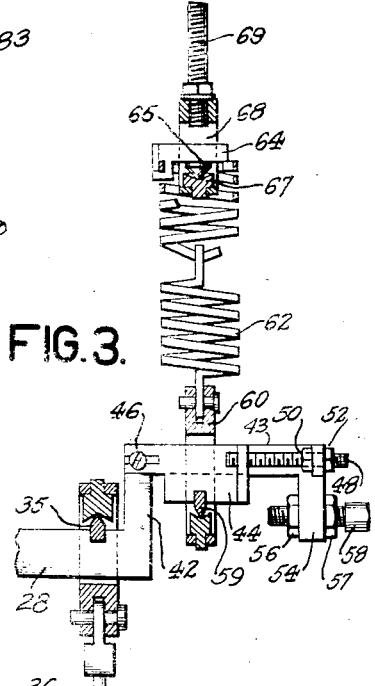
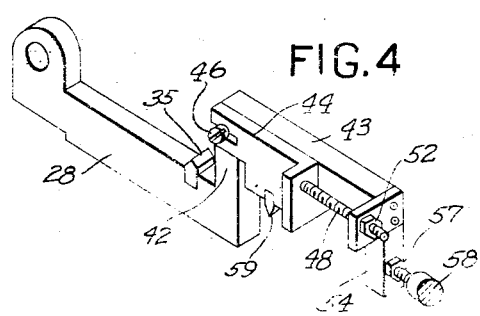
INVENTOR
MATTHEW THORSSON
BY
ATTORNEYS Patented Nov. 13, 1945

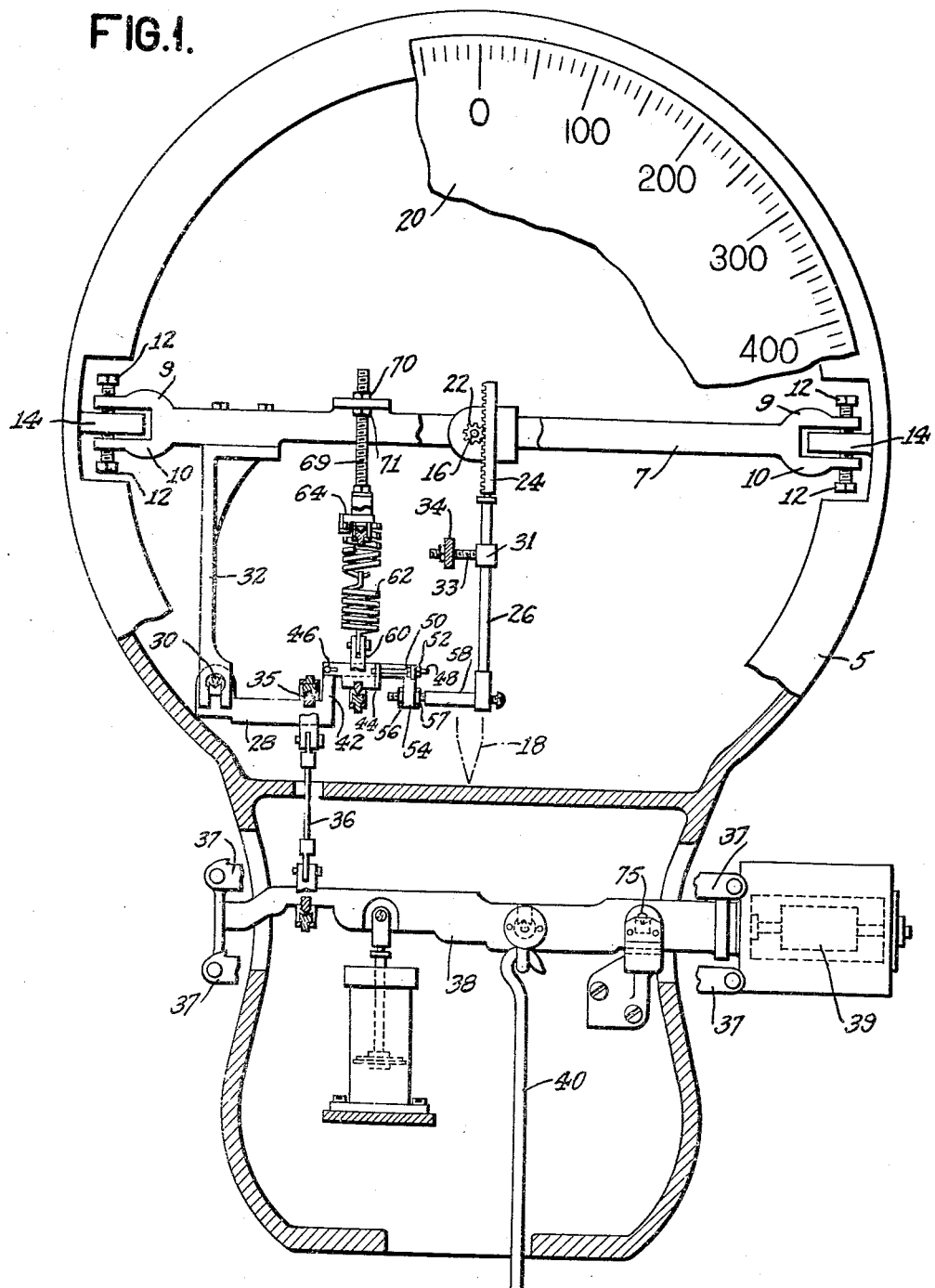

2,389,108

UNITED STATES PATENT OFFICE 2,389,108

SCALE

Matthew Thorsson, Rutland, Vt., assignor to The Howe Scale Company, Rutland, Vt., a corporation of Vermont Application September 23, 1942, Serial No. 459,456

1 Claim. (Cl. 265—68)

This invention relates to weighing scales of high capacity and more particularly to such weighing scales in which a pointer is moved over a graduated dial by means of a spring counterbalanced rack in proportion to the load on the scale, although not so limited.

One object of the present invention is a scale having a minimum movement of the beam lever.

Another object of the invention is a spring dial scale in which the elongation of the spring is reduced to a minimum.

It is also an object of the invention to attain maximum movement of the indicator actuating rack for greatest possible ease in calibrating.

A further object of the invention is a scale construction which will enable the scale to weigh, when out of level, with the smallest possible error.

Still another object of the invention is a scale construction in which the vertical center of gravity is balanced in two intersecting vertical planes.

These and other objects of the invention and the means for their attainment will be more apparent from the following detailed description taken in connection with the accompanying drawings illustrating one embodiment by which the invention may be realized and in which:

Figure 1 is a view showing the mechanism of the scale of this invention above the scale platform, parts being broken away in the interest of clearness;

Figure 2 is a view in perspective showing the platform and associated mechanism; and Figure 3 is an enlarged view of the rack arm and its associated parts.

Figure 4 is a perspective view of the rack arm and associated parts.

Referring first to Figure 1, a dial housing, which may be representative of any convenient housing or support for the scale mechanism, is indicated at 5. Extending between opposite sides of the dial housing 5 is a frame member 7 forked as at 9, 10 at its ends and provided with set screws 12 to permit levelling or other adjustment of the frame member with respect to supporting bosses 14 carried by the frame 5.

On the frame member 7 is rotatably mounted, as in bearings, an arbor 16 on which is carried the hand or pointer, a fragmentary portion of the end of which is indicated at 18. Rotation of the arbor, as will be understood, causes the pointer to travel over the dial 20.

Arbor 16 carries a pinion 22 in mesh with the rack 24. The rack is carried on the upper end of a vertically disposed rod 26 connected to the free end of a rack arm 28 which is pivoted at its other end, by knife edges 30, on a frame 32 depending from the frame member 7.

To assure proper meshing of the teeth of the rack 24 with the teeth of the pinion 22, a guide is provided in the form of a sleeve 31 mounted on the end of a threaded stud 33 which passes freely through a bracket 34 on the scale housing and carries a nut, as shown. Rack arm 28 carries knife edges 35 supporting the upper end of the rod 36 connecting the rack arm 28 with the tare beam 38 which which the steelyard rod 40 extends to the platform lever system and on which are carried beams 37 for the usual sliding poises (not shown). The tare beam 38 may carry the conventional counterweight or ball 39 to alter its center of gravity.

Rack arm 28 is formed intermediate its ends with a saddle-carrying portion comprising the upwardly extending portion 42, bridge portion 43 and the downwardly extending vertical arm 54. On the portion 43 there is slidably mounted a saddle 44 which has a portion extending underneath and adapted to support the portion 43. At one end saddle 44 is slotted to receive a lock screw 46 and at the other end it carries a bolt 48 by which its position relative to the rack arm may be adjusted by means of the lock nuts 50 and 52. The saddle 44 carries a knife edge 59 whose location along the rack arm can be adjusted by movement of the saddle. The lower end of the vertical arm 54 is apertured to receive the threaded end of an adjustable rack arm end portion 58 which may be adjustably fixed in position by lock nuts 56 and 57.

The knife edge 59 of the rack arm 28, shown in an enlarged view, Figure 3, is supported in a loop or stirrup 60 which is suspended on the end of a coil spring 62 secured at its upper end to a spring clamp 64 which spring clamp is rotatably mounted by means of a cone bearing 65 carried in a cup bearing 67 on a stirrup 68 adjustably supported by a threaded connection and lock nut with the rod 69 which is threaded into the frame 7 and secured in adjusted position by the lock nuts 70 and 71. This construction facilitates calibration of the scale in that it is simply necessary to loosen lock screw 46 and turn the nuts 50 and 52 and adjust the saddle 44 longitudinally. Further longitudinal adjustment of the rack arm 28 in order that the rod 26 be vertical may be effected by nuts 56 and 57. Again by adjusting the nuts 70 and 71, effecting a change in vertical distance from frame 7 of the loop 60, the position of the indicator may be changed.

For instance, in one proportion of parts a change of .001 of an inch in vertical distance at this point causes the indicator hand 18 to move one graduation on dial 20.

The scale of this invention provides further means to balance the parts to minimize errors in weighing due to the scale being placed on surfaces, such as the floor or a table, which are not level. As shown in Fig. 2, a ball or adjusting counterbalacing weight 73 is therefore mounted on the beam lever between the fulcrum 75 and the conventional zero adjustment 77. Raising or lowering the ball 73 will offset errors arising from tilting the scale to the right and left. A second adjustable ball 79 on the platform lever 80 at a selected point between the fulcrum 81 of this lever and the stirrup 83 of the steelyard rod 40 will counteract errors caused by tilting the scale to the front or back.

It will thus be seen that a scale construction has been provided in which the rack is capable of alignment in all directions to assure perfect meshing of the teeth. Furthermore, the rack arm may be utilized to adjust the indicator for correct weighing. In this scale, also, the vertical center of gravity is balanced in either or both of two planes, to wit, sidewise and lengthwise of the scale whereby to compensate for shifts of balance in either one of these planes.

Various modifications will occur to those skilled in the art in the selection of the particular instrumentalities to be availed of to effect the several adjustments and compensations forming the subject matter of this invention, and no limitation is intended by the phraseology of the foregoing description or illustrations in the accompanying drawings except as indicated in the appended claim.

What is claimed is:

In a scale of the character described, a frame, an arbor rotatably mounted on the frame, a pinion carried by the arbor, a rack arm, a rack connected thereto and meshing with the pinion, said rack arm comprising a bridge portion and end portions, one of said end portions being pivotally mounted at one end on the frame and at its other end joining with an upwardly extending arm portion joined to one end of said bridge portion, the other end of said bridge portion being provided with securing means for an adjusting bolt and a downwardly extending portion, a saddle slidable along said bridge portion, means to secure one end of said saddle to the rack arm, an adjusting bolt connected to the other end of the saddle and adapted to cooperate with said securing means to position said saddle, the other end portion comprising a threaded portion received in said downwardly extending portion, and lock nuts on said threaded portion to adjustably secure said other end portion and the downwardly extending portion together.

MATTHEW THORSSON.